3,041,319
POLYMERS OF HYDROXYALKYL VINYLBENZYL ETHERS
John G. Abramo, Springfield, Mass., assignor to Monsanto Chemical Company, St. Louis, Mo., a corporation of Delaware
No Drawing. Filed Mar. 25, 1960, Ser. No. 17,457
9 Claims. (Cl. 260—80.3)

The present invention relates to synthetic copolymer or interpolymer materials and more particularly to materials of this type containing available hydroxyl groups.

Copolymers or interpolymers constituted of vinylbenzyl ethers as presently known are unavailable for cross-linking or curing using comparatively mild conditions, i.e., those of compounding and partially reacting the ethers with agents such as the di-isocyanates, di-acid chlorides, etc. followed by application and then exposure to elevated temperatures. This reflects that the ethers known to date are the alkyl vinylbenzyl ethers. Rather, to cross-link or cure polymers of alkyl vinylbenzyl ethers much more severe methods than that outlined above must be used which can result in degradation of the polymers and their properties.

Accordingly, it is a principal object of this invention to provide synthetic copolymers or interpolymers of vinylbenzyl ethers which are capable of being cross-linked or cured through a method designed to effect minimum degradation of the said copolymers or interpolymers.

Other objects of the invention will in part be obvious and will in part appear hereinafter.

These and other objects of the present invention are attained in synthetic polymeric materials comprising in interpolymerized form (A) hydroxyalkyl vinylbenzyl ethers having the structure:

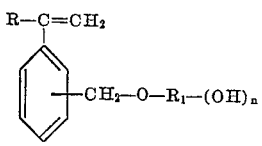

wherein R is selected from the class consisting of hydrogen and methyl radical, $R_1$ is an alkyl radical and $n$ represents an integer of 1–2 with (B) vinyl components selected from the class consisting of (1) amides, esters and nitriles of acrylic acids and methacrylic acids, (2) 1,3-dienes, (3) styrenes and mixtures of the same.

The following examples are given in illustration of the invention. Where parts are mentioned, parts by weight are intended unless otherwise described.

*Example I*

A solution of 100 grams of toluene containing 30 grams butadiene, 10 grams 2-hydroxyethyl p-vinylbenzyl ether, 0.5 ml. ditertiary butyl peroxide and 0.25 ml. tertiary dodecyl mercaptan is charged to a 300 ml. rocking pressure bomb and heated under an inert atmosphere at 140° C. for 16 hours. The reaction product which results is a clear colorless viscous syrup. The copolymer is recovered from the syrup by precipitation in ethanol and is then dried in vacuo at room temperature for 16 hours. The copolymer (20 grams) is a clear, colorless, tough elastomeric material containing 2.04% hydroxyl content (23% 2-hydroxyethyl p-vinylbenzyl ether) which can be dissolved in common solvents such as benzene, toluene, dioxane, etc.

*Example II*

A viscous solution is prepared constituting 1.50 grams of the polymer produced in Example I in 4.50 grams of equal parts xylene and butanol. Two grams of the solution are mixed with 0.10 gram of a 60% solids solution in equal parts of xylene-butanol of a modified partially butylated hexamethylol melamine, to form a clear, colorless solution of the same. A film 3 mil thickness is cast from the latter onto a 10 mil steel plate. After being cured in a circulating air oven for 30 min. at 160° C., the film is clear, glossy and colorless in appearance. Additionally, the film is extremely tough; strongly adheres to the plate and remains unattacked by xylene-butanol mixtures; and even after being contacted with these mixtures will not chip or craze when the steel plate is bent.

*Example III*

An autoclave fitted with a stirrer is purged of air and while being maintained under an atmosphere of nitrogen is charged with a solution constituting 70 grams of isoprene, 30 grams of 2-hydroxyethyl p-isopropenylbenzyl ether, 0.2 gram of ditertiarybutyl peroxide, and 70 grams of toluene. The autoclave is sealed, stirring is started and is heated at 110° C. under autogenous pressure for 20 hours. Thereafter, the autoclave is cooled and opened. The reaction product is obtained as a swollen gel. The toluene solvent is leached from the copolymer by heating the gel at 60° C. in 300 ml. of methanol for three hours, followed by decanting of the solution phase. The leaching operation is repeated three times. After drying, the copolymer is in the form of a rubbery mass, e.g., has elastomeric properties, and corresponds to nearly 100% yield based on the initial monomeric amounts.

*Example IV*

The following materials are charged to a 28 oz. bottle:

| | Grams |
|---|---|
| Water | 300 |
| Sodium aralkyl polyether sulfate | 25 |
| $K_2S_2O_8$ | 0.5 |
| Butadiene | 100 |
| 2-hydroxyethyl p-vinylbenzyl ether | 20 |
| Styrene | 20 |
| t-Dodecyl mercaptan | 0.5 |

The bottle and charged materials are purged with nitrogen and maintained under a nitrogen atmosphere.

After being sealed with a rubber lined cap, the bottle is rotated end-over-end in a constant temperature bath set at 50° C. for 40 hours. The cap is then punctured and unreacted butadiene is vented off. The reaction product which results is emulsion in form. A sample of the emulsion is evaporated and the conversion of monomers to polymers is determined at 75%. The emulsion is broken by freezing and the polymer is obtained as a white rubbery solid material.

*Example V*

A solution constituted of 8 grams of acrylamide, 4 grams of 2-hydroxyethyl p-isopropenylbenzyl ether and 0.5 ml. of di-tertiarybutyl peroxide is sealed in 8 mm. glass tubes under nitrogen and heated in an oil bath at 120° C. for 16 hours. A hard, light yellow polymer is obtained which is solvated in hot formamide and precipitated from benzene. Analysis of the polymer for hydroxyl groups yield values consistent with the monomer charge placed in the polymerization tube.

*Example VI*

A solution constituted of 8.0 grams acrylonitrile and 4.0 grams of 4-hydroxybutyl p-vinylbenzyl ether is added to a warm solution of 0.2 gram $K_2S_2O_8$ and 1 gram of triethanol amine in 50 ml. of water. Polymerization starts almost immediately and is essentially complete in one hour. The white flocculent precipitate is collected on a filter and washed with water and alcohol. The product on drying weighs 12 grams. On analysis the product is found to contain 19.1% nitrogen. This corresponds to a polymer composition of 27.5% 4-hydroxybutyl p-vinylbenzyl ether and 72.5% acrylonitrile. This polymer gives very viscous solutions in dimethyl formamide.

*Example VII*

A solution constituted of 8.0 grams of butyl methacrylate, 2.0 grams of 2-hydroxyethyl p-vinylbenzyl ether, 10 grams of butyl alcohol and 0.5 ml. of di-tertiary butyl peroxide is sealed in 8 mm. glass tubes under nitrogen and heated for 3 hours at 140° C. The resulting clear, colorless, viscous solution is added to hexane with the result that a colorless, tough polymer becomes precipitated. The product weighs 6.5 grams and contains 2.5 hydroxyl content by weight. This polymer is found to be soluble in xylene, butanol and other common solvents.

*Example VIII*

Five grams of styrene, 5 grams of 2,3-dihydroxypropyl p-vinylbenzyl ether and 0.1 gram of di-tertiary butyl peroxide are poured into 8 mm. glass tubes. The tubes are flushed with nitrogen, sealed and heated in an oil bath set at 130° C. for 10 hours. A hard, slightly yellowed polymer is obtained which slowly dissolves in hot dimethyl formamide.

*Example IX*

A solution of 20 grams of toluene, 5 grams of styrene, 5 grams of 2,3-dihydroxyisobutyl p-vinylbenzyl ether and 0.1 gram of di-tertiary butyl peroxide is sealed in 8 mm. glass tubes. The tubes are heated for 15 hours in an oil bath set at 120° C. The polymer is obtained as a hard, colorless, solid which can be dissolved in hot dimethyl formamide.

The present invention is directed to copolymers or interpolymers comprising in polymerized form (A) hydroxyalkyl vinyl benzyl ethers having the structure:

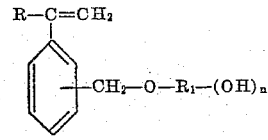

wherein R is selected from the class consisting of hydrogen and methyl radical, $R_1$ is an alkyl radical and $n$ represents an integer of 1–2 with (B) a vinyl component selected from the class consisting of (1) amides, esters and nitriles of acrylic acids and methacrylic acids, (2) 1,3-dienes, (3) styrenes and mixtures of the same.

The hydroxyalkyl vinylbenzyl ethers which are involved in practice of the present invention are those having the structure:

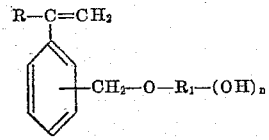

wherein R is selected from the class consisting of hydrogen and methyl radical, $R_1$ is an alkyl radical and $n$ represents an integer of 1–2. In their preferred form the subject ethers are those in which the alkyl function symbolized by $R_1$ is saturated, can include an ether or oxygen linkage therein and contain 2–10 carbon atoms. The alkyl function can be straight chained or branched in nature. The hydroxyl function contained in the alkyl function ($R_1$) can be 1 and 2 in number and the location on the said alkyl function can be anywhere on the chain with preference directed to locating the hydroxyl function on the terminal ends of the former. When two hydroxyl functions are contained on the alkyl function, they are attached to different carbons of said alkyl function. Representative of the subject ethers are the 2-hydroxyethyl o-vinylbenzyl ethers; 2-hydroxyethyl m-vinylbenzyl ethers; 2-hydroxyethyl p-vinylbenzyl ethers; 2-hydroxyethyl o-isopropenylbenzyl ethers; 2-hydroxyethyl m-isopropenylbenzyl ethers; 2-hydroxyethyl m-isopropenyl benzyl ethers; 3-hydroxypropyl o-vinylbenzyl ethers; 3-hydroxypropyl m-vinylbenzyl ethers; 3-hydroxpropyl p-vinylbenzyl ethers; 3-hydroxypropyl o-isopropenylbenzyl ethers; 3-hydroxypropyl m-isopropenylbenzyl ethers; 3-hydroxypropyl p-isopropenylbenzyl ethers; 2-hydroxypropyl o-vinylbenzyl ethers; 2-hydroxypropyl m-vinylbenzyl ethers; 2-hydroxypropyl p-vinylbenzyl ethers; 2-hydroxypropyl o-isopropenylbenzyl ethers; 2-hydroxypropyl m-isopropenylbenzyl ethers; 2-hydroxypropyl p-isopropenylbenzyl ethers; 2,3-dihydroxypropyl o-vinylbenzyl ethers; 2,3-dihydroxypropyl m-vinylbenzyl ethers; 2,3-dihydroxypropyl p-vinylbenzyl ethers; 2,3-dihydroxypropyl o-isopropenylbenzyl ethers; 2,3-dihydroxypropyl m-isopropenylbenzyl ethers; 2,3-dihydroxypropyl p-isopropenylbenzyl ethers; 4-hydroxybutyl o-vinylbenzyl ethers; 4-hydroxybutyl m-vinylbenzyl ethers; 4-hydroxybutyl p-vinylbenzyl ethers; 4-hydroxybutyl o-isopropenylbenzyl ethers; 4-hydroxybutyl m-isopropenylbenzyl ethers; 4-hydroxybutyl p-isopropenylbenzyl ethers; 3,4-dihydroxybutyl o-vinylbenzyl ethers; 3,4-dihydroxybutyl m-vinylbenzyl ethers; 3,4-dihydroxybutyl p-vinylbenzyl ethers; 3,4-dihydroxybutyl o-isopropenylbenzyl ethers; 3,4-dihydroxybutyl p-isopropenylbenzyl ethers; 3,4-dihydroxy-2-butyl o-vinylbenzyl ethers; 3,4-dihydroxy-2-butyl m-vinylbenzyl ethers; 3,4-dihydroxy-2-butyl p-vinylbenzyl ethers; 3,4-dihydroxy-2-butyl o-isopropenylbenzyl ethers; 3,4-dihydroxy-2-butyl m-isopropenylbenzyl ethers; 3,4-dihydroxy-2-butyl p-isopropenylbenzyl ethers; etc. Also intended are those ethers such as are represented by beta-(2-hydroxyethoxy)ethyl p-vinylbenzyl ethers, beta-(2-hydroxyethoxy)ethyl m-vinylbenzyl ethers, beta-(2-hydroxyethoxy)ethyl p-vinylbenzyl ethers, beta-(2-hydroxyethoxy)ethyl o-isopropenylbenzyl ethers, beta-(2-hydroxyethoxy)ethyl m-isopropenylbenzyl ethers, beta-(2-hydroxyethoxy)ethyl p-isopropenylbenzyl ethers, etc. Various simple substituents such as the halogens and alkyl radical can coincidentally be accommodated on the phenyl radical to provide hydroxyalkyl vinylbenzyl ethers which are intended here. Additionally, while homopolymers of each of the ethers are primarily intended, copolymers restricted to mixtures of the identified ethers are also intended here. The subject ethers can be produced in the manner set forth in copending application S.N. 747,832, filed July 11, 1958, in the name of John G. Abramo.

The vinyl component (B) which can be used in practice of the present invention is selected from the class consisting of (1) amides, esters and nitriles of acrylic acids or methacrylic acids, (2) 1,3-dienes, (3) styrenes; and mixtures of the same.

The first group of vinyl components (B) which are acrylic or methacrylic compounds can be visualized as having the structure:

where $R_2$ is selected from the class consisting of hydrogen and methyl radical and $R_3$ is selected from the class consisting of (a) carbamyl radicals having the structure:

(b) carbalkoxy radicals having the structure:

wherein $R_4$ is an alkyl radical, and (c) a nitrile radical having the structure:

and mixtures of the same. Representative of the acrylic and methacrylic compounds containing carbamyl radicals, that is the amides, are acrylamide and methacrylamide. The acrylic alkyl esters and methacrylic alkyl esters then are preferably those containing 1–8 carbon atoms in the longest continuous chain of the alkyl radical ($R_4$) on the alcoholic moiety thereof. These will include methyl acrylate, methyl methacrylate, ethyl acrylate, ethyl methacrylate, n-propyl acrylate, n-propyl methacrylate, n-butyl acrylate, n-butyl methacrylate, etc. The subject nitriles are represented by acrylonitrile and methacrylonitrile.

The second group of vinyl components (B) are the 1,3-dienes having the structure:

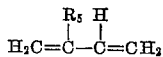

wherein $R_5$ is selected from the class consisting of hydrogen, chlorine and methyl radicals. These include butadiene, chloroprene and isoprene.

The third group of vinyl components are (B) the styrenes which can include styrene, alpha-methylstyrene, o-, p- and m-methylstyrenes, o-, p- and m-chlorostyrene, etc.

Copolymers which are particularly desirable are those containing in copolymerized form 2 to 98 weight percent of (A) the hydroxyalkyl vinylbenzyl ether and 98 to 2 weight percent of (B) the vinyl component, determined on the weight of the copolymer. More preferably they can contain 10 to 75 weight percent of (A) the hydroxyalkyl vinylbenzyl ethers and 90 to 25 weight percent of (B) the vinyl component. Accordingly, copolymers containing about 0.25 to 9.4% hydroxyl content as determined on a weight basis, exhibit desirable properties, with those containing 1.25 to 7.25% hydroxyl content being the more preferred.

The copolymers of the present invention can be prepared using mass, solution or emulsion polymerization techniques.

In the mass and solution polymerizations, a monomer mixture is prepared of from 2 to 98 parts by weight of (A) hydroxyalkyl vinylbenzyl ether and 98 to 2 parts by weight of (B) the vinyl component, parts by weight being determined on the weight of the total monomers. Copolymerization can be thermally initiated but it is preferred to employ a small quantity of a free radical polymerization initiator such as hydrogen peroxide, ditertiary-butyl peroxide, benzoyl peroxide, tertiary butyl perbenzoate, pinacolone peroxide, ditertiarybutyl hydroperoxide, azo-bis-isobutyronitrile, etc. The amount of such initiator employed will generally fall within the range of about 0.05 to 5.0 parts by weight per 100 parts of total monomers. This may, however, be varied.

The solvents suitable for use in the solution-type of polymerization are organic liquids which are inert to the reaction, e.g., toluene, xylene, benzene, dioxane, etc.

In the emulsion polymerization, a monomeric mixture prepared as above, is continuously and slowly added to an excess of water maintained at a polymerization temperature of 30 to 150° C. and autogenous pressure. An emulsifying agent and a polymerization catalyst are necessary in carrying out this type of polymerization. Either or both can be initially present in the water in whole or in part, or added as an aqueous solution together with the monomeric mixtures. The amount of water to be used can be varied within wide limits. It is generally preferable, however, to use from about 100–300 parts of water per 100 parts of monomeric mixture in order to obtain aqueous copolymer latices constituting from 25–50% solids by weight.

The identity of the emulsifying agents can be varied. They can be nonionic, anionic or cationic. Those which operate satisfactorily either alone or in mixtures thereof include salts of high molecular weight fatty acids, quaternary ammonium salts, alkali metal salts of rosin acids, alkali metal salts of long-chain sulfates and sulfonates, ethylene oxide condensates of long-chain fatty acids, alcohols or mercaptans, sodium salts of sulfonated hydrocarbons, aralkyl sulfonates, etc. Representative of emulsifiers which can be used are sodium laurate, triethanolamine, sodium lauryl sulfate, 2-ethylhexyl esters of sulfosuccinic acid, sodium salt of dioctyl sulfosuccinic acid, etc. Generally, from about 0.1–5.0 parts by weight of emulsifier per 100 parts of total monomer operates quite satisfactorily.

Polymerization initiators or catalysts suitable for use in the emulsion-type polymerizations designed to produce the copolymers of the present invention include free radical initiators such as potassium persulfate, cumene hydroperoxide, ammonium persulfate as well as various of the redox-type catalyst systems represented by combinations of any of hydrogen peroxide, potassium persulfate, cumene hydroperoxide, tertiarybutylisopropyl benzene hydroperoxide, diisopropylbenzene hydroperoxide, etc. with any of potassium ferricyanide, dihydroxyacetone, sodium formaldehyde sulfoxylate, triethanolamine, glucose, fructose, etc. The amount of initiator utilized conveniently can range from about 0.05–5.0 parts by weight per 100 parts by weight of total monomer.

The copolymers of the present invention are clear, substantially colorless materials which can be used in linear copolymer form, or as obtained from any of the mass, solution or emulsion polymerization processes described above, to provide a variety of film, coating or laminating applications. Application of the copolymers is facilitated by their solubility in organic solvents. Of particular interest, and due to the presence of available hydroxyl groups on the copolymers of the present invention, they can be compounded with other materials such as melamineformaldehyde and urea-formaldehyde condensates, alkyd resins as well as other curing agents such as di-isocyanates, di-acid chlorides, etc. Then after being so compounded or mixed and then dissolved in solvents such as xylene, dimethylformamide, dioxane, and they can be partially advanced, then preliminarily fabricated into films, coatings, laminate adhesives, etc. and finally on exposure to elevated temperatures they are caused to become cured or cross-linked, with the hydroxyl groups present on the copolymers acting as sites for reaction with the curing agents. Curing can also be facilitated, with or without the use of elevated temperature, by the use of catalysts. In cross-linked or cured form the copolymers of the present invention are resistant to attack by common organic solvents and when cured in the manner described above, give no indication of having been degraded by the same.

The copolymers of the present invention can also be compounded with various fillers and adjuncts such as colorants, plasticizers, etc.

It will thus be seen that the objects set forth above among those made apparent from the preceding description are efficiently attained and since certain changes can be made in carrying out the above process and in the polymer products which result without departing from the scope of the invention, it is intended that all matter contained in the above description shall be interpreted as illustrative and not in a limiting sense.

What is claimed is:
1. Synthetic polymer materials comprising in polymerized form (A) hydroxyalkyl vinylbenzyl ethers having the structure:

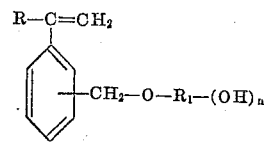

wherein R is selected from the class consisting of hydrogen and methyl radical, $R_1$ is an alkyl radical containing 2–10 carbon atoms and $n$ represens an integer of 1–2 with (B) vinyl components selected from the class consisting of (1) amides, esters and nitriles of acrylic acids and methacrylic acids, (2) 1,3-dienes selected from the class consisting of butadiene, chloroprene and isoprene, (3) styrenes and mixtures of the same.

2. A synthetic copolymer material according to claim 1 wherein the (A) hydroxyalkyl vinylbenzyl ether is 2- hydroxyethyl p-vinylbenzyl ether and the (B) vinyl component is butadiene.

3. A synthetic copolymer material according to claim 1 wherein the (A) hydroxyalkyl vinylbenzyl ether is 2-hydroxyethyl p-isopropenylbenzyl ether and the (B) vinyl component is isoprene.

4. A synthetic copolymer material according to claim 1 wherein the (A) hydroxyalkyl vinylbenzyl ether is 2-hydroxyether p-vinylbenzyl ether and the (B) vinyl component is butadiene and styrene.

5. A synthetic copolymer material according to claim 1 wherein the (A) hydroxyalkyl vinylbenzyl ether is 2-hydroxyethyl p-isopropenylbenzyl ether and the (B) vinyl component is acrylamide.

6. A synthetic copolymer material according to claim 1 wherein the (A) hydroxyalkyl vinylbenzyl ether is 4-hydroxybutyl p-vinylbenzyl ether and the (B) vinyl component is acrylonitrile.

7. A synthetic copolymer material according to claim 1 wherein the (A) hydroxyalkyl vinylbenzyl ether is 2-hydroxyethyl p-vinylbenzyl ether and the (B) vinyl component is butyl methacrylate.

8. A synthetic copolymer material according to claim 1 wherein the (A) hydroxyalkyl vinylbenzyl ether is 2,3-dihydroxypropyl p-vinylbenzyl ether and the (B) vinyl component is styrene.

9. A synthetic copolymer material according to claim 1 wherein the (A) hydroxyalkyl vinylbenzyl ether is 2,3-dihydroxyisobutyl p-vinylbenzyl ether and the (B) vinyl component is styrene.

References Cited in the file of this patent

UNITED STATES PATENTS

| | | |
|---|---|---|
| 2,522,501 | Brooks et al. | Sept. 19, 1950 |
| 2,531,355 | Emerson | Nov. 21, 1950 |
| 2,850,480 | D'Alelio | Sept. 2, 1958 |
| 2,850,481 | D'Alelio | Sept. 2, 1958 |